United States Patent

Suzuoki et al.

[19]

[11] Patent Number: 5,949,969
[45] Date of Patent: *Sep. 7, 1999

[54] APPARATUS AND METHOD FOR PROVIDING TEXTURE OF A MOVING IMAGE TO A SURFACE OF AN OBJECT TO BE DISPLAYED

[75] Inventors: Masakazu Suzuoki, Tokyo; Makoto Furuhashi, Kanagawa, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/679,787

[22] Filed: Jul. 15, 1996

Related U.S. Application Data

[63] Continuation of application No. 08/154,620, Nov. 18, 1993, Pat. No. 5,537,224.

[30] Foreign Application Priority Data

Nov. 24, 1992 [JP] Japan ..................................... 4-336593
Nov. 24, 1992 [JP] Japan ..................................... 4-336594

[51] Int. Cl.⁶ ..................................................... H04N 1/40
[52] U.S. Cl. .......................... 395/116; 395/109; 382/254; 345/430
[58] Field of Search ..................................... 358/434, 448, 358/443, 450, 452, 462, 469; 382/181, 254; 395/129–132, 135, 109, 115–116; 345/429–432

[56] References Cited

U.S. PATENT DOCUMENTS

| | | | |
|---|---|---|---|
| 4,754,269 | 6/1988 | Kishi et al. | 340/729 |
| 4,935,879 | 6/1990 | Ueda | 364/522 |
| 5,175,806 | 12/1992 | Muskovitz et al. | 395/125 |
| 5,267,154 | 11/1993 | Takeuchi et al. | 364/419.2 |
| 5,537,224 | 7/1996 | Suzuoki et al. | 358/462 |

*Primary Examiner*—Thomas D Lee
*Assistant Examiner*—Stephen Brinich
*Attorney, Agent, or Firm*—Jay H. Maioli

[57] ABSTRACT

Image processing method and apparatus for producing an image from image data provides an image memory including a drawing area to store image data of an object to be drawn and a texture area to store texture data to decorate the object, a supply circuit for supplying image data to the image memory, a selector for selectively supplying the image data from the supply circuit to the drawing area and the texture area, an image synthesizing circuit for synthesizing an image from the image data stored in the image memory and an output circuit for converting an output signal from the image synthesizing circuit to a video signal for outputting the video signal. The method provides the steps of storing image data of an object to be drawn in a drawing area of an image memory, storing moving image data in a texture area of the image memory, and mapping a texture of the moving image stored in the texture area onto the surface of the object stored in the drawing area.

6 Claims, 7 Drawing Sheets

APPARATUS AND METHOD FOR PROVIDING TEXTURE OF A MOVING IMAGE TO A SURFACE OF AN OBJECT TO BE DISPLAYED

This is a continuation of application Ser. No. 08/154,620 filed Nov. 18, 1993 now U.S. Pat. No. 5,537,224.

BACKGROUND OF THE INVENTION

1. Field of the Invention

This invention relates generally to an image processing apparatus and method for generating an image from data stored in a memory and, more specifically, to generating an image that has texture or ornamentation on its surfaces, such as an image for use in a computer game.

2. Description of the Background

In order to enjoy a computer game high-speed processing and an excellent graphics display ability are required. Among such video games it is required to display a 3-dimensional object at a high speed, to realize visual effects such as textures or the like, or to display other information with reality. The texture is intended to cause a visual effect that is peculiar to the particular 3-dimensional object by seemingly adhering a pattern, which was defined in a different place, onto the surface of the 3-dimensional object. As examples of such patterns which are adhered to the surface of the object, there is a geometric pattern or a still pattern, such as a photograph, a hand written drawing, or the like.

It is also desirable that a moving image be used as a texture pattern in order to provide distinctive computer graphics. Hitherto, however, a texture pattern has been predetermined and the texture pattern cannot dynamically be rewritten onto selected images. Therefore, the texture pattern of the moving image cannot be adhered to the surface of the object using computer graphics.

Further, since the texture pattern cannot dynamically be rewritten as mentioned above, a texture having a large change cannot be adhered to the surface of the object.

Moreover, hitherto, the number of colors of the texture pattern is limited due to a limitation in number of bits and a number of colors that can be expressed.

OBJECTS AND SUMMARY OF THE INVENTION

Therefore, it is an object of the present invention to provide an image processing apparatus that can adhere a texture pattern of a moving image to an object using computer graphics.

Another object of the present invention is to provide an image processing method that can adhere a texture pattern having a large change to an object using computer graphics.

Still another object of the present invention is to provide an image processing method that can express a number of colors using a relatively small number of bits.

According to an aspect of the invention, there is provided an image processing apparatus for producing an image from image data which includes an image memory having a drawing area to store data of an object to be drawn and a texture area to store texture image data used to decorate an object, a supply circuit for supplying image data to the image memory, a selector for selectively supplying the image data from the supply circuit to the drawing area and the texture area, an image synthesizer for synthesizing an image from the image data stored in the image memory, and an output circuit for converting an output signal from the image synthesizer to a video signal for outputting the video signal.

According to another aspect of the present invention, there is provided image processing apparatus for producing an image from image data which including an image memory having a drawing area to store an image of an object to be drawn and a texture area to store a texture image to decorate such object, a supply circuit for supplying image data to the image memory, a transferring circuit for transferring the image data stored in the drawing area, an image synthesizing circuit for synthesizing an image from the image data stored in the image memory, and output circuit for converting an output signal from the image synthesizing circuit to a video signal and for outputting the video signal.

According to still another object of the present invention, there is provided an image processing method for producing an image from image data which including the steps of storing image data of an object to be drawn in a drawing area of an image memory, storing moving image data in a texture area of the image memory, and mapping a texture of the moving image stored in the texture area onto the surface of the object stored in the drawing area.

According to yet another object of the present invention, there is provided an image processing method for producing an image from image data which including the steps of storing image data of an object to be drawn in a drawing area of an image memory, storing texture image data to decorate an object in a texture area of the image memory, mapping the texture pattern stored in the texture area onto the object stored in the drawing area, and rearranging the object onto which the texture pattern was mapped in the texture area.

The above and other objects, features, and advantages of the present invention will become readily apparent from the following detailed description thereof, which is to be read in connection with the accompanying drawings.

DETAILED DESCRIPTION OF PREFERRED EMBODIMENTS

Figure 1:
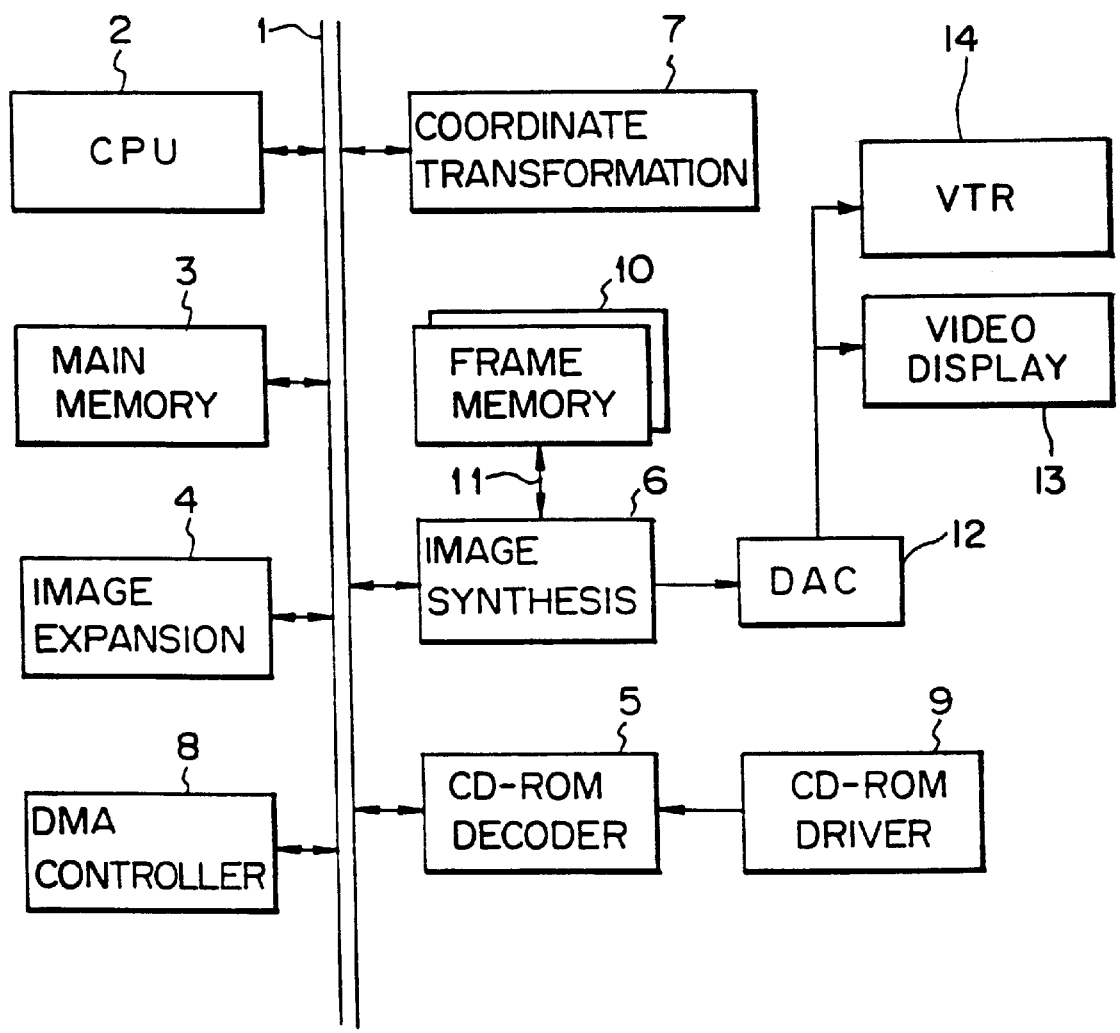
FIG. 1 is a block diagram of an embodiment of the present invention.

FIG. 1 shows one embodiment of the present invention, in which a CPU 2, a main memory 3, an image expansion unit 4, a CD-ROM decoder 5, an image synthesis unit 6, a coordinate transformation unit 7, and a DMA controller 8 are connected to a system bus 1.

A CPU of 32 bits is advantageously used as the CPU 2, and this CPU 2 manages the whole system. For example, a sorting process to decide the order within which to draw a polygon onto a screen is executed by the CPU 2.

The image expansion unit 4 executes an expanding process of an image that was compressed by a discrete cosine transform (DCT), for example.

The CD-ROM decoder 5 is connected to a CD-ROM driver 9 and decodes an application program or data from a CD-ROM loaded in the CD-ROM driver 9. Moving image data, which can be image data compressed by a DCT, can be recorded in the CD-ROM.

The image synthesis unit 6 is connected to a frame memory 10 through a local bus 11. The frame memory 10 is constructed by two frame memories, and the two frame memories are switched every vertical period. The frame memory 10 includes a texture area to store a texture image and a drawing area to store an image to be drawn. Further, a color look-up table (CLUT) is provided in the frame memory 10. An output for display of the image generated by the image synthesis unit 6 is generated through a D/A converter 12.

As an example of the computer generated image operation the image synthesis unit 6 executes a slope calculation and a polygon drawing. The polygon data in the main memory 3, which was sorted by the CPU 2, is sent to the image synthesis unit 6 in the sorted order and a slope is calculated by a slope calculating unit (not shown) that is part of the image synthesis unit 6. The slope calculation is a calculation to obtain a slope of a plane of the modified mapping data when the inside of a polygon is filled with mapping data in the drawing of a polygon. In the case of texture, the polygon is filled with texture data and in the case of Gouraud shading, the polygon is filled with luminance values.

The coordinate transformation unit 7 executes a 3-dimensional coordinate transformation and a conversion from 3-dimensional data to 2-dimensional data for display on the screen. The coordinate transformation unit 7 and the main memory 3 can perform direct memory access (DMA) transfer of the data by the DMA controller 8. The coordinate transformation unit apparatus 7 obtains the data from the main memory 3 through the system bus 1 and executes a coordinate transformation of the data and then again transfers the converted data back into the main memory 3 through the system bus 1. Data of an object represented in the 3-dimensional space comprises modeling data indicative of a shape of the object and geometry data indicative of the coordinate position orientation of the object to be displayed.

The DMA controller 8 executes controls relevant to image synthesizing processes that use memories, such as the writing of data to memories and the reading of data from memories.

Figure 2:
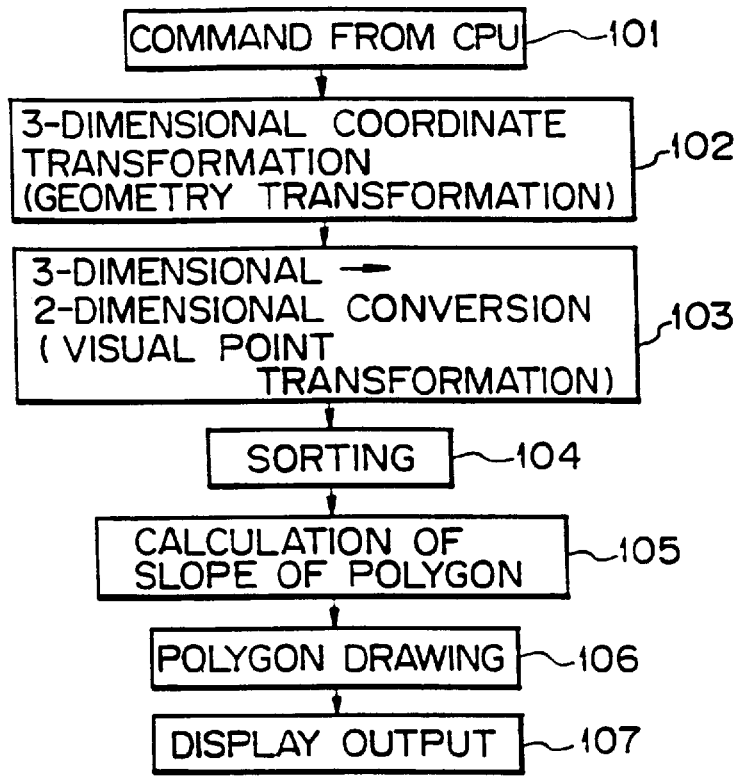
FIG. 2 is a flowchart useful in explaining an embodiment of the present invention.

FIG. 2 shows a flowchart of the overall steps involved in providing the polygon drawing. When a command is generated from the CPU 2 in step 101, the data from the main memory 3 is transferred to the coordinate transforming apparatus 7 through the system bus 1. The 3-dimensional coordinate transformation is then executed in the coordinate transforming apparatus 7 in step 102, so that the data is converted from 3-dimensional data to 2-dimensional data for the screen in step 103. The converted data is transferred to the main memory 3 through the system bus 1 and is sorted by the CPU 2 in step 104. The data sorted by the CPU 2 is sent to the image synthesis unit 6 through the system bus 1. The slope is calculated by the image synthesizing apparatus 6 in step 105 and a polygon to be displayed is drawn in step 106. The resultant image is generated and displayed in step 107.

Figure 3:
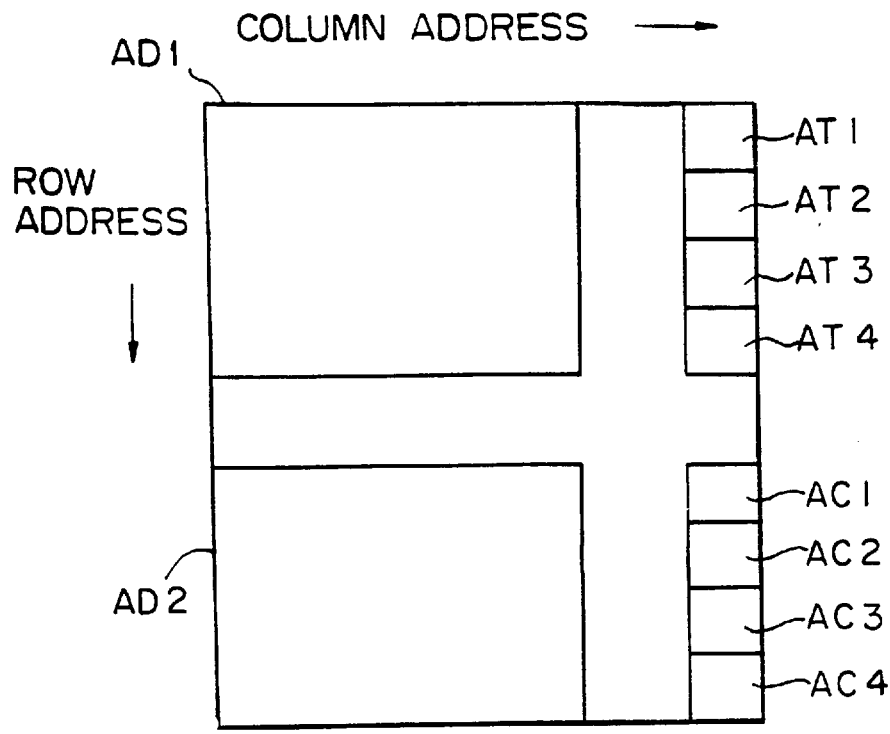
FIG. 3 is a diagram useful in explaining a memory construction in an embodiment of the present invention.

The frame memory 10 has a texture area to store the texture image and a drawing area to store the image to be drawn, and FIG. 3 shows a memory space of the frame memory 10. The frame memory 10 has been addressed by 2-dimensional addresses of columns and rows. In the 2-dimensional address space, areas AT1, AT2, AT3, and so on are set as the texture areas and any number of kinds of texture patterns can be arranged into the texture areas AT1, AT2, AT3, and so on. AD1 denotes a drawing area and an image plane to be drawn is developed in the drawing area AD1. The areas AC1, AC2, AC3, and so on denote color look-up table (CLUT) areas.

Figure 4:
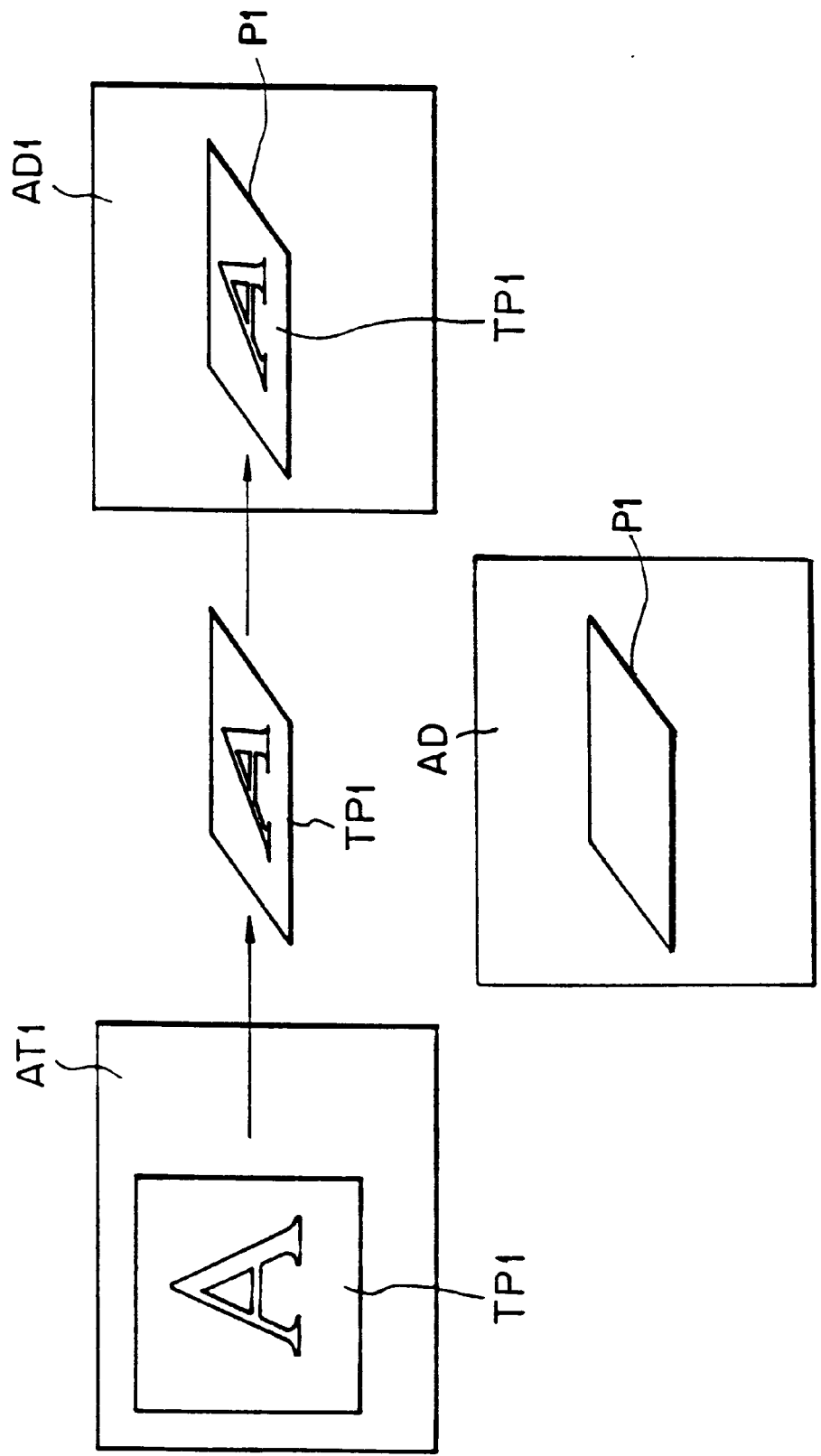
FIGS. 4A–4C are diagrams useful in explaining a texture operation in an embodiment of the present invention.

In the case of adhering the texture to the surface of the object that has been generated, the texture data in the texture areas AT1, AT2, AT3 is 2-dimensional mapping transformed. For example, the texture pattern TPa as shown in FIG. 4A is coordinate transformed onto a 2-dimensional screen as shown in FIG. 4B. The 2-dimensional mapping transformed texture pattern TP1 is sent to the drawing area AD1 as shown in FIG. 4C and synthesized onto the surface of the object on the drawing area AD1.

Figure 5:
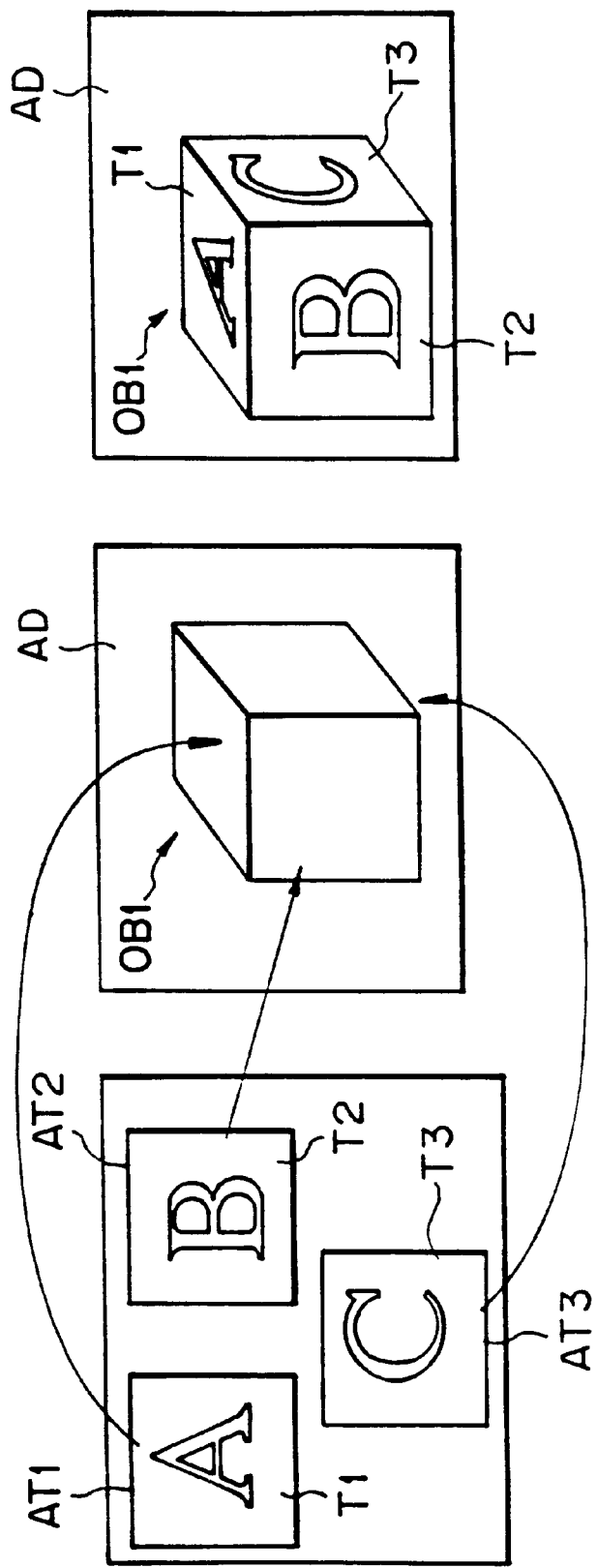
FIGS. 5A–5C are diagrams useful in explaining a texture operation in an embodiment of the present invention.
Figure 6:
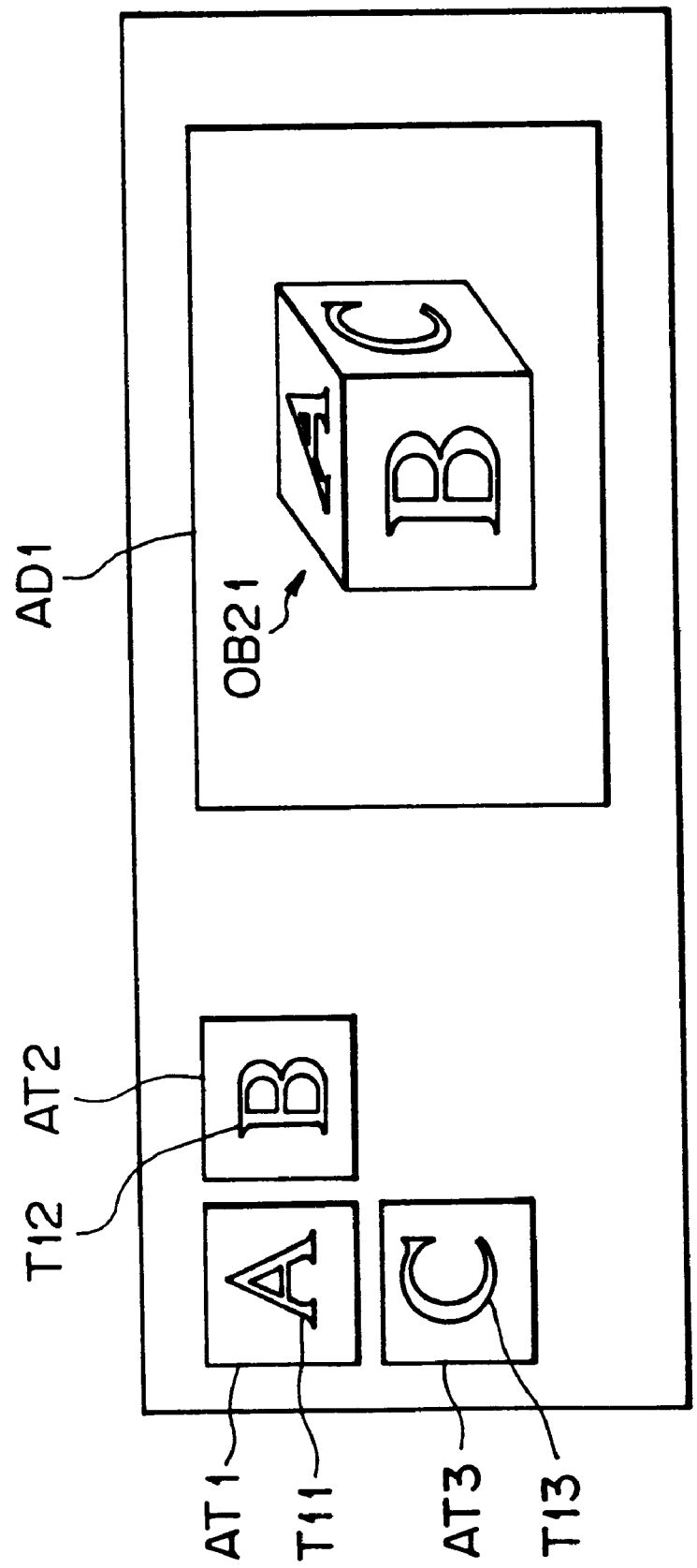
FIG. 6 is a diagram useful in explaining a texture operation in an embodiment of the present invention.

In the case of mapping the texture to the image of a polygon, texture patterns T1, T2, and T3 in the texture areas AT1, AT2, and AT3 as shown in FIG. 5A are read out and are 2-dimensional mapping transformed and adhered onto the surfaces of a solid object OB1 shown in FIG. 5B. Subsequently, as shown in FIG. 5C, the textures T1, T2, and T3 are adhered onto the surfaces of the object OB1 and are arranged in the drawing area AD1. The image plane of the drawing area AD1 is then display ed on the screen as the computer generated graphic.

In the case of still image, the texture patterns in the main memory 3 are transferred to the texture areas AT1, AT2, AT3, and so on in the frame memory 10 through the image synthesis unit 6, and the image synthesis unit 6 adheres the texture patterns to the surfaces of the polygon which appear on the screen. Due to this operation, the texture of the still image is realized on the object.

Further, a texture can also be applied to a moving image. In the case of a moving image, the compressed moving image data from the CD-ROM is once read into the main memory 3 and the compressed image data is then sent to the image expander 4. The image data is expanded by the image expander 4 and the moving image data is sent to the texture areas AT1, AT2, AT3, and so on in the frame memory 10. Because the texture areas AT1, AT2, AT3 are provided in the frame memory 10, the texture pattern itself can be also rewritten every frame. When the moving image data is sent to the texture areas AT1, AT2, and AT3 the texture is dynamically rewritten and changes in the texture of the moving image are realized.

The compressed moving image data from the CD-ROM is read into the main memory 3, the compressed image data is expanded by the image expander 4, and the expanded data is sent to the drawing area AD1 in the frame memory 10, so that the moving image can be directly drawn on the screen.

Further, the object in the drawing area AD1 in the frame memory 10 can be moved to the texture areas AT1, AT2, AT3. Due to this, the object with the texture pattern adhered thereto can be further set as the next texture pattern. Due to this, a texture pattern having a very large change can be formed.

Figure 7:
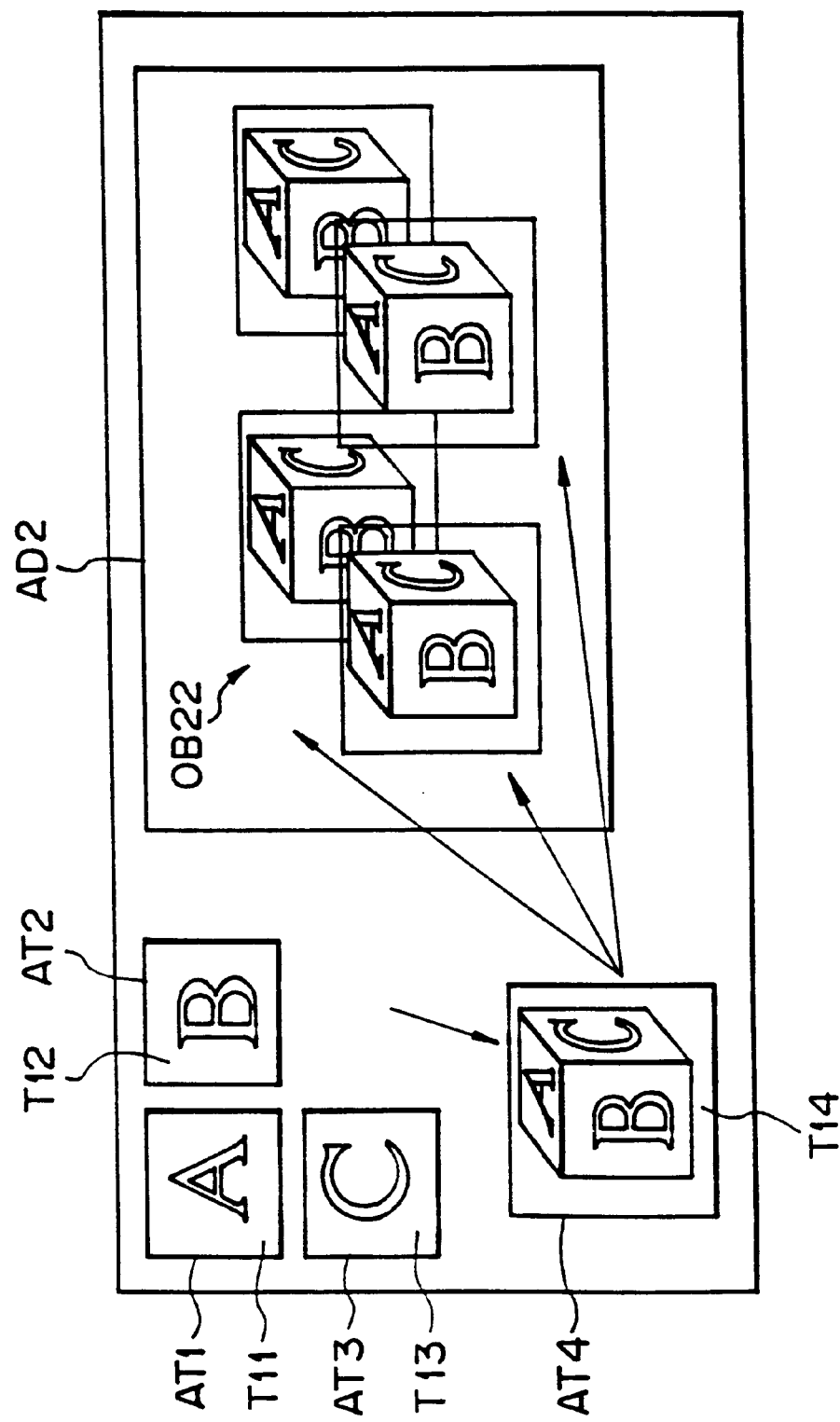
FIG. 7 is a diagram useful in explaining a texture operation in an embodiment of the present invention.

For instance, as shown in FIG. 7, texture patterns T11, T12, and T13 existing in the texture areas AT1, AT2, and AT3, respectively, are adhered to the object and developed into the drawing area AD1. The image plane in the drawing area AD1 is subsequently moved to the texture area AT4 and a texture pattern T14 in the texture area AT4 is further adhered to an object OB22. As mentioned above, the object to which the texture was adhered can itself become a texture.

Figure 8:
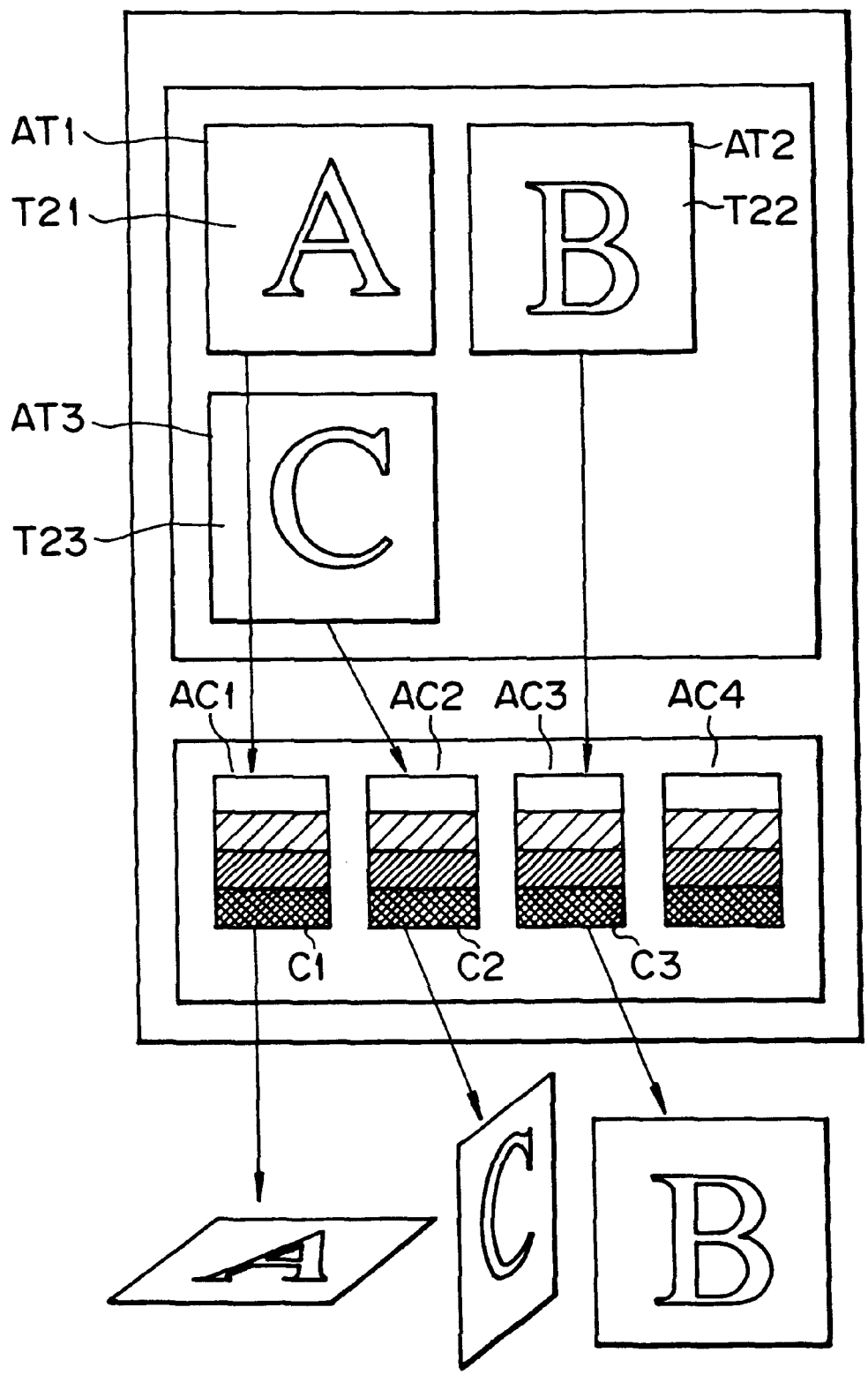
FIG. 8 is a diagram useful in explaining a color look-up table in an embodiment of the present invention.

The color look-up table (CLUT) areas AC1, AC2, and AC3 are provided in the frame memory 10. For instance, as shown in FIG. 8, CLUT tables C1, C2, C3 are provided in the areas AC1, AC2, AC3 for texture patterns T21, T22, T23, respectively. The colors of the texture patterns T21, T22, T23 are designated by the CLUT tables C1, C2, and C3, respectively.

In many cases, such as where an image is used as a texture pattern, a special color is used, like a surface pattern of brick. In such an image, by previously registering into the CLUT the colors that are used, the number of bits per pixel can be reduced. Nevertheless, in general, the kinds of colors that are used have a tendency such that they are different for every texture, for example, the surface pattern of brick and the surface pattern of stone. When such different surfaces must be expressed by a single CLUT, the image quality is deteriorated due to the decrease in number of colors. According to an embodiment of the invention, therefore, a plurality of CLUT tables C1, C2, and C3 are prepared and the CLUT can be selected for each specific texture.

There is no need to have a one-to-one corresponding relation between the CLUT table and the texture pattern. One CLUT table can also be commonly used by a plurality of texture patterns. For example, assuming that the number of bits of the texture is equal to four, when a single CLUT table is used, the number of colors which can be expressed by the texture mapping is equal to only sixteen. However, if the CLUT table can be selected for every texture pattern, the number of colors that can be expressed in three texture patterns is equal to 48 colors, even when the number of bits is only equal to four.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For example, according to the embodiment described above, the image data has been compressed and recorded in the CD-ROM, however, the image data can be also compressed and recorded on other recording medium, such as a magnetic disc or a semiconductor memory, like a memory card.

The image compressing method is not limited to the DCT but other compressing methods can be also advantageously used.

What is claimed is:

1. An image processing apparatus for producing a textured image from three-dimensional image data of an object, said apparatus comprising:

a main memory for storing three-dimensional image data;

means for converting said three-dimensional image data to two-dimensional image data by executing three-dimensional coordinate transformation on said three-dimensional image data;

an image memory having a plurality of frame memories respectively corresponding to a plurality of frames, each of said frame memories including therein a drawing area for storing an image to be drawn and a texture area for storing texture data, said drawing area and said texture area of each of said frame memories being arranged at a same address space of said image memory;

image synthesizing means connected to said image memory for applying texture to said two-dimensional image data in said drawing area based on said texture data, said two-dimensional image data being converted from said three-dimensional image data by said means for converting, wherein a texture pattern of said two-dimensional image data in said drawing area is rewritten for each of said plurality of frames based on said texture data respectively included in each of said plurality of frame memories respectively corresponding to each of said plurality of frames; and output means for converting an output signal read out from said image memory to a video signal to be displayed.

2. An image processing apparatus according to claim 1, wherein each of said frame memories further includes a color look-up table area for storing a color look-up table having color information related to said texture data.

3. An image processing apparatus for producing a colored image from three-dimensional image data of an object, said apparatus comprising:

a main memory for storing three-dimensional image data;

means for converting said three-dimensional image data to two-dimensional image data by executing three-dimensional coordinate transformation on said three-dimensional image data;

an image memory having a plurality of frame memories respectively corresponding to a plurality of frames, each of said frame memories including therein a drawing area for storing an image to be drawn and a color look-up table area for storing color information, said drawing area and said color look-up table area of each of said frame memories being arranged at a same address space of said image memory;

image synthesizing means connected to said image memory for applying color to said two-dimensional image data in said drawing area based on said color information, said two-dimensional image data being converted from said three-dimensional image data by said means for converting, wherein a color pattern of said two-dimensional image data in said drawing area is rewritten for each of said plurality of frames based on said color information respectively included in each of said plurality of frame memories respectively corresponding to each of said plurality of frames; and output means for converting an output signal read out from said image memory to a video signal to be displayed.

4. An image processing apparatus according to claim 3, wherein each of said frame memories further includes a texture data area for storing texture data, wherein a color corresponding to said texture data is represented by said color information stored in said color look-up table.

5. An image processing method comprising the steps of:

transforming three-dimensional image data into two-dimensional image data by executing three-dimensional coordinate transformation on said three-dimensional image data;

storing said two-dimensional image data in a drawing area of a frame memory of an image memory, wherein said image memory includes a plurality of frame memories respectively corresponding to a plurality of frames;

storing texture data corresponding to said two-dimensional image data in a texture area of said frame memory, wherein said drawing area and said texture area share a common frame memory of said image memory such that each of said plurality of frame memories includes a respective drawing area and a respective texture area;

applying a texture pattern to said two-dimensional image data in said drawing area based on said texture data to form textured two-dimensional image data, said two-dimensional image data being transformed from said three-dimensional image data by said three-dimensional coordinate transformation;

updating said texture pattern of said two-dimensional image data for each of said plurality of frames based on said texture data respectively in each of said plurality of frame memories which respectively correspond to each of said plurality of frames; and outputting said textured two-dimensional image data as a video signal.

6. An image processing method comprising the steps of:

transforming three-dimensional image data into two-dimensional image data by executing three-dimensional coordinate transformation on said three-dimensional image data;

storing said two-dimensional image data in a drawing area of a frame memory of an image memory, wherein said image memory includes a plurality of frame memories respectively corresponding to a plurality of frames;

storing color information corresponding to said two-dimensional image data in a color look-up table area of said frame memory;

storing texture data corresponding to said two-dimensional image data in a texture area of said frame memory, wherein said drawing area, said color look-up table area, and said texture area share a common frame memory of said image memory;

applying color and a texture pattern to said two-dimensional image data in said drawing area based on said color information and said texture data, respectively, to form synthesized two-dimensional image data, said two-dimensional image data being transformed from said three-dimensional image data by said three-dimensional coordinate transformation, wherein each of said plurality of frame memories includes a respective drawing area, a respective color look-up table, and a respective texture area;

updating said color and said texture pattern of said two-dimensional image data for each of said plurality of frames based on said color information and said texture data in each of said plurality of frame memories which respectively correspond to each of said plurality of frames; and outputting said synthesized two-dimensional image data as a video signal.

\* \* \* \* \*